(12) United States Patent
Moore

(10) Patent No.: US 8,462,931 B2
(45) Date of Patent: Jun. 11, 2013

(54) MONITORING SIGNAL PATH QUALITY IN A CONFERENCE CALL

(75) Inventor: Sean S. B. Moore, Hollis, NH (US)

(73) Assignee: Avaya, Inc., Basking Ridge, NJ (US)

( * ) Notice: Subject to any disclaimer, the term of this patent is extended or adjusted under 35 U.S.C. 154(b) by 1383 days.

(21) Appl. No.: 11/420,316

(22) Filed: May 25, 2006

(65) Prior Publication Data

US 2007/0286347 A1 Dec. 13, 2007

(51) Int. Cl.
*H04L 1/20* (2006.01)
(52) U.S. Cl.
USPC .............. 379/202.01; 379/133; 379/204.01; 379/206.01; 348/14.08; 348/14.12; 370/260
(58) Field of Classification Search
USPC ............ 379/202.01–206.01, 133; 348/14.08, 348/14.12; 370/260
See application file for complete search history.

(56) References Cited

U.S. PATENT DOCUMENTS

| 6,226,513 | B1 | 5/2001 | Wierzbicki et al. | |
|---|---|---|---|---|
| 6,243,454 | B1 | 6/2001 | Eslambolchi | |
| 6,922,431 | B1 * | 7/2005 | Weber et al. | 375/130 |
| 7,532,581 | B1 * | 5/2009 | Metzger et al. | 370/252 |
| 2002/0075857 | A1 * | 6/2002 | LeBlanc | 370/352 |
| 2003/0050783 | A1 * | 3/2003 | Yoshizawa | 704/270.1 |
| 2004/0028199 | A1 * | 2/2004 | Carlson | 379/93.21 |
| 2005/0213731 | A1 | 9/2005 | Rodman et al. | |
| 2006/0023061 | A1 * | 2/2006 | Vaszary et al. | 348/14.08 |
| 2006/0109786 | A1 * | 5/2006 | Abdel-Kader et al. | 370/232 |
| 2006/0126538 | A1 * | 6/2006 | Krstulich | 370/260 |

FOREIGN PATENT DOCUMENTS

WO WO2005112413 * 11/2005

* cited by examiner

*Primary Examiner* — Rasha Al Aubaidi
*Assistant Examiner* — Jirapon Intavong

(57) ABSTRACT

It is recognized in the disclosed technique that the way impairments on a conference call are diagnosed and handled in the prior art can sometimes be as distracting as the impairments themselves. The disclosed technique attempts to address some of the disadvantages in the prior art by monitoring the signal path quality on a conference call and, based on the quality of the signals received, performing one or more actions that are intended to minimize distractions while handling the impairments. In particular, in accordance with the illustrative embodiment of the present invention, the technique performs a multi-threshold evaluation of media signals that are received at a conferencing server. If a measure of the impairment being considered exceeds a first threshold, but not a higher second threshold, then a first set of actions is taken to handle the impairment. If the measure exceeds the second threshold, then a more-extreme second set of actions is taken.

12 Claims, 5 Drawing Sheets

MONITORING SIGNAL PATH QUALITY IN A CONFERENCE CALL

FIELD OF THE INVENTION

The present invention relates to telecommunications in general, and, more particularly, to monitoring signal path quality in a conference call.

BACKGROUND OF THE INVENTION

A telephone conference call is a means by which multiple participants communicate by calling into a conference "bridge," a system that enables all of the call's participants to hear each other. The bridge is typically part of a conferencing server, a data-processing system that fulfills conferencing service requests from its users. The conferencing server enables dial-in and dial-out conferencing that involves two or more telecommunications terminals. Such terminals include plain old telephone service (POTS) telephones, packet-capable telephones, personal computers that comprise softphone or other communications functionality, and so forth.

The bridging function in a conferencing server mixes media signals, for each participant, from other sources on a conference call. Although typically the media signals that are mixed are voice signals, other media signals such as non-voice audio and video signals can also be mixed. The conferencing server provides the mixed signals to each participant so that the participants on the conference call can hear or otherwise communicate with each other.

The problem with mixing the signals is that if there is an impairment that is received on one of the signal paths, such as noise from one of the telephones involved, then that impairment usually ends up being mixed into the composite signal made available to all of the participants. Therefore, even if one signal path is the source of an impairment, all of the participants might hear the impairment, thus diminishing the conferencing experience.

Various techniques in the prior art deal with how a signal impairment such as noise is suppressed or at least mitigated. Some of those techniques are applied to the telecommunications terminal, while other techniques are applied to the intermediate signal path, while still other techniques are applied to the conferencing server end. Those prior art techniques are intended to improve the conferencing experience in that they attempt remove or reduce the problem—that is, the presence of signal impairments.

SUMMARY OF THE INVENTION

Although various techniques in the prior art deal with how the signal impairment is suppressed or at least mitigated, those prior art techniques in many instances are still invasive to the conference call. For example, in the prior art it is often up to a conference call participant to realize that something is wrong—typically by hearing complaints from fellow participants about echo, background noise, or some other impairment—and to take action such as by putting the telephone on mute. In short, the way that impairments are diagnosed and handled in the prior art is often as distracting as the impairments themselves.

The present invention is a technique that attempts to address some of the disadvantages in the prior art by monitoring the signal path quality on a conference call and, based on the quality of the signals received, performing one or more actions that are intended to minimize distractions while handling the impairments. In particular, in accordance with the illustrative embodiment of the present invention, the technique of the illustrative embodiment performs a multi-threshold evaluation of media signals that are received—for example, at a conferencing server. If a measure of the impairment being considered exceeds a first threshold, but not a higher second threshold, then a first set of actions is taken to handle the impairment. If a measure of the impairment exceeds the second threshold, then a more-extreme second set of actions is taken.

The first set of actions attempts to first notify either (i) the user of the telecommunications terminal on whose signal path the impairment has been detected or (ii) the conferencing administrator. In some embodiments, the user is notified by the conferencing server of the illustrative embodiment (or by the administrator) only when it is determined that the user is not speaking. For example, a user might hear something like "your telephone connection quality is poor; please mute your phone when possible."Alternatively, the first set of actions might inevitably involve (i) automatically muting, at the conferencing server, the offending receive signal path and (ii) also notifying the affected user. For example, a user or administrator might hear something like "participant Jones has been placed in listen-only mode; you may override this action by pressing the # key."In accordance with the illustrative embodiment, whether the user is notified to mute the telephone or the receive voice path is automatically muted depends on one or more parameters such as (i) a characteristic of the impairment, (ii) the terminal type of the affected telecommunications terminal, and (iii) the number of terminals involved in the conference call. The idea behind using one or more of these parameters is that the parameters can provide a clue of what the call participants are experiencing with respect to the signal impairment.

The second set of actions is invoked only when the measure of the impairment has exceeded a second threshold. In the second set of actions, the conferencing server unconditionally mutes the receive voice path. A key idea behind having a second threshold, in addition to the first threshold, is that the affected user is disrupted only when the signal quality is so bad that not muting the voice path would have a bigger disruption on the other call participants. In some scenarios, one could set the first threshold to the level at which the impairment is noticed by the call participants, but is not really an annoyance, while one could set the second threshold to the level at which the impairment becomes a significant distraction to the participants.

The illustrative embodiment of the present invention comprises: evaluating one or more signals that are received via a first receive voice path from a first telecommunications terminal for the presence of a first impairment; and when a measure of the first impairment exceeds a first threshold, selecting one of: (i) notifying, of the presence of an impairment, one of: (a) the user of the first telecommunications terminal, and (b) the administrator of a conference call in which the first telecommunications terminal is involved, and (ii) muting the first receive voice path; wherein the selection depends on a characteristic of the first impairment.

DETAILED DESCRIPTION

Figure 1:
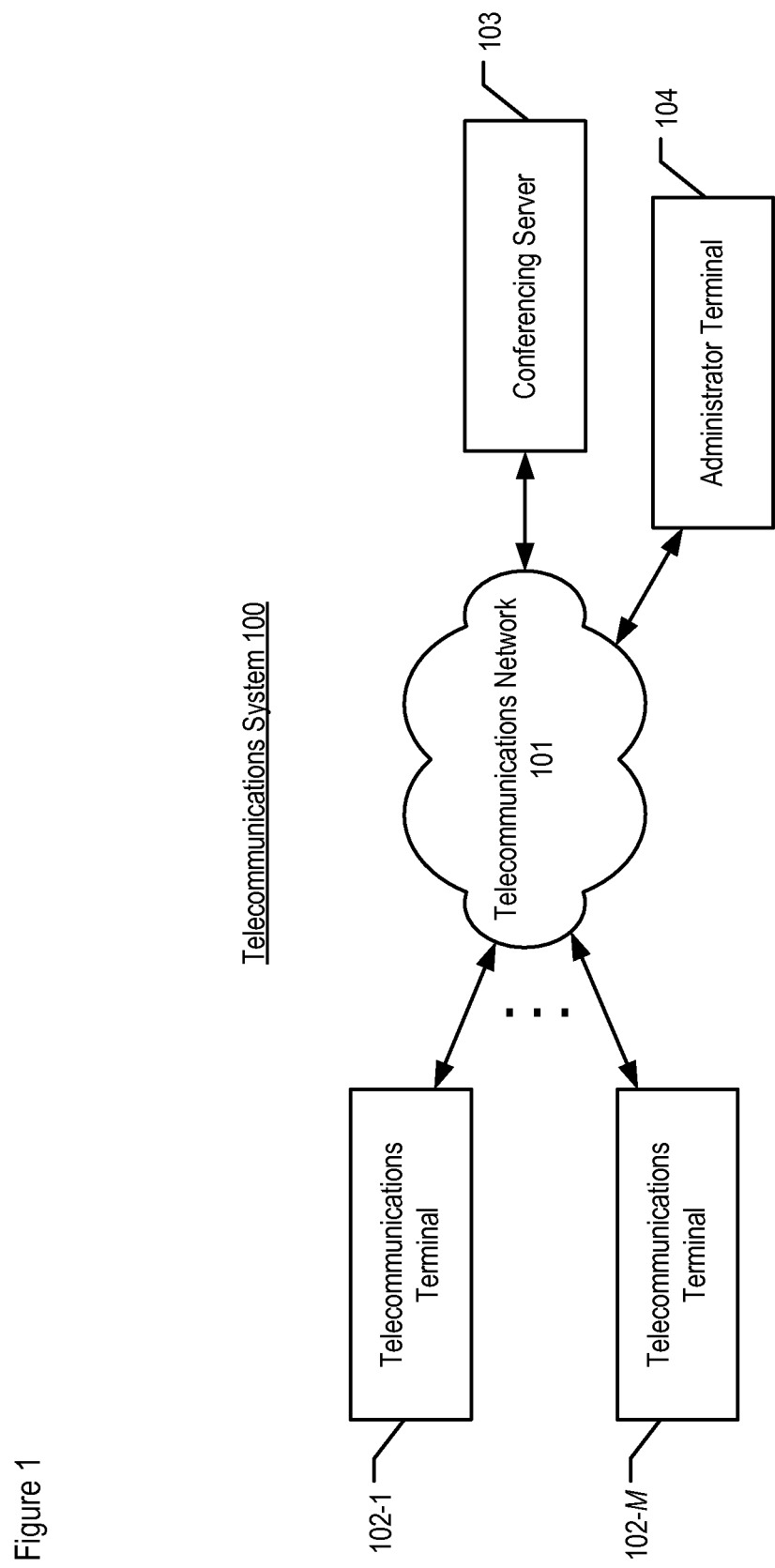
FIG. 1 depicts telecommunications system 100 in accordance with the illustrative embodiment of the present invention.

FIG. 1 depicts telecommunications system 100 in accordance with the illustrative embodiment of the present invention. Telecommunications system 100 comprises telecommunications network 101; telecommunications terminals 102-1 through 102-M, wherein M is a positive integer; conferencing server 103; and administrator terminal 104, interconnected as shown. Telecommunications system 100 is capable of both packet-based and circuit-based switching and transmission of media signals (e.g., voice, audio, video, etc.), as is well-known in the art. However, it will be clear to those skilled in the art, after reading this specification, how to apply the present invention to alternative embodiments with all packet-based switching and transmission or all circuit-based switching and transmission.

Telecommunications network 101 is a telecommunications network that comprises one or more of the Internet, the Public Switched Telephone Network (PSTN), and so forth. Network 101 comprises or is connected to one or more transmission-related nodes such as gateways, routers, or switches that are used to direct data packets from one or more sources to the correct destinations of those packets. Network 101 is capable of handling Internet Protocol-based messages in well-known fashion that are transmitted among two or more Internet Protocol-capable processing systems such as between an IP-based telecommunications terminal and conferencing server 103, between a gateway that acts on behalf of an analog telecommunications terminal and server 103, and so forth.

Telecommunications terminal 102-$m$, for m=1 through M, is a communications device such as an analog telephone, an Internet Protocol-based endpoint, a Session Initiation Protocol-based endpoint, a notebook computer, a personal digital assistant (PDA), a tablet computer, and so forth. Each terminal is capable of originating outgoing calls and receiving incoming calls, in well-known fashion. In addition, each terminal is capable of one or more communication modes that comprise, but are not limited to voice, audio, video, data, email, instant messaging, and chat. It will be clear to those skilled in the art how to make and use telecommunications terminals 102-1 through 102-M.

Conferencing server 103 is a data-processing system that fulfills conferencing service requests from its users, and is depicted in additional detail below and with respect to FIG. 2. Server 103 enables, in well-known fashion, dial-in and dial-out conferencing that involves two or more of telecommunications terminals 102-1 through 102-M. Server 103 comprises a bridging function that mixes media, for each participant, from other sources on a conference call. Server 103 also comprises conference applications, in well-known fashion. In the illustrative embodiment, server 103 operates in accordance with the Internet Protocol for the purpose of handling traffic packets. In some alternative embodiments, as those who are skilled in the art will appreciate, server 103 can operate in accordance with a different protocol, analog or digital.

In accordance with the illustrative embodiment, conferencing server 103 receives, evaluates, and takes action based on one or more media signals such as voice. The details of this process are described below and with respect to FIGS. 3 through 5. As those who are skilled in the art will appreciate, the functionality described in this specification with respect to conferencing server 103 can be implemented in something that is referred to as other than a "server." In any event, it will be clear to those who are skilled in the art, after reading this specification, how to make and use conferencing server 103.

Those skilled in the art will note that although FIG. 1 and its descriptions might imply that the conferencing system of the illustrative embodiment uses a centralized control model, the present invention is not dependent on a centralized control model and can be realized in conferencing systems that use a fully distributed control model, such as what might be used in a peer-to-peer (P2P) telephony system with conferencing capability. In P2P telephony conferencing, as is known in the art, each P2P phone receives a signal from every other P2P phone in the conference and mixes the signals locally, in contrast to a centralized control model in which each phone sends a signal to a remote host, where the mixing is performed and where the mixed signal is sent back to each phone.

Administrator terminal 104 is a communications device that enables a conferencing service administrator or attendant to monitor conferencing server 103 for one or more conference calls, and to communicate with one or more of terminals 102-1 through 102-M, in well-known fashion. In accordance with the illustrative embodiment, terminal 104 is the combination of a workstation and telephone. As those who are skilled in the art will appreciate, terminal 104 can be a device such as an analog telephone, an Internet Protocol-based endpoint, a Session Initiation Protocol-based endpoint, a notebook computer, a personal digital assistant (PDA), a tablet computer, and so forth. Terminal 104 is capable of one or more communication modes that comprise, but are not limited to voice, video, data, email, instant messaging, and chat. It will be clear to those skilled in the art, after reading this specification, how to make and use administrator terminal 104.

As with conferencing server 103, the administrative terminal capability can be fully distributed as in a peer-to-peer telephony system, in some embodiments, instead of being centralized. Those who are skilled in the art will appreciate that the administrative functions used in the present invention are not dependent on either the centralized or fully-distributed control model.

Figure 2:
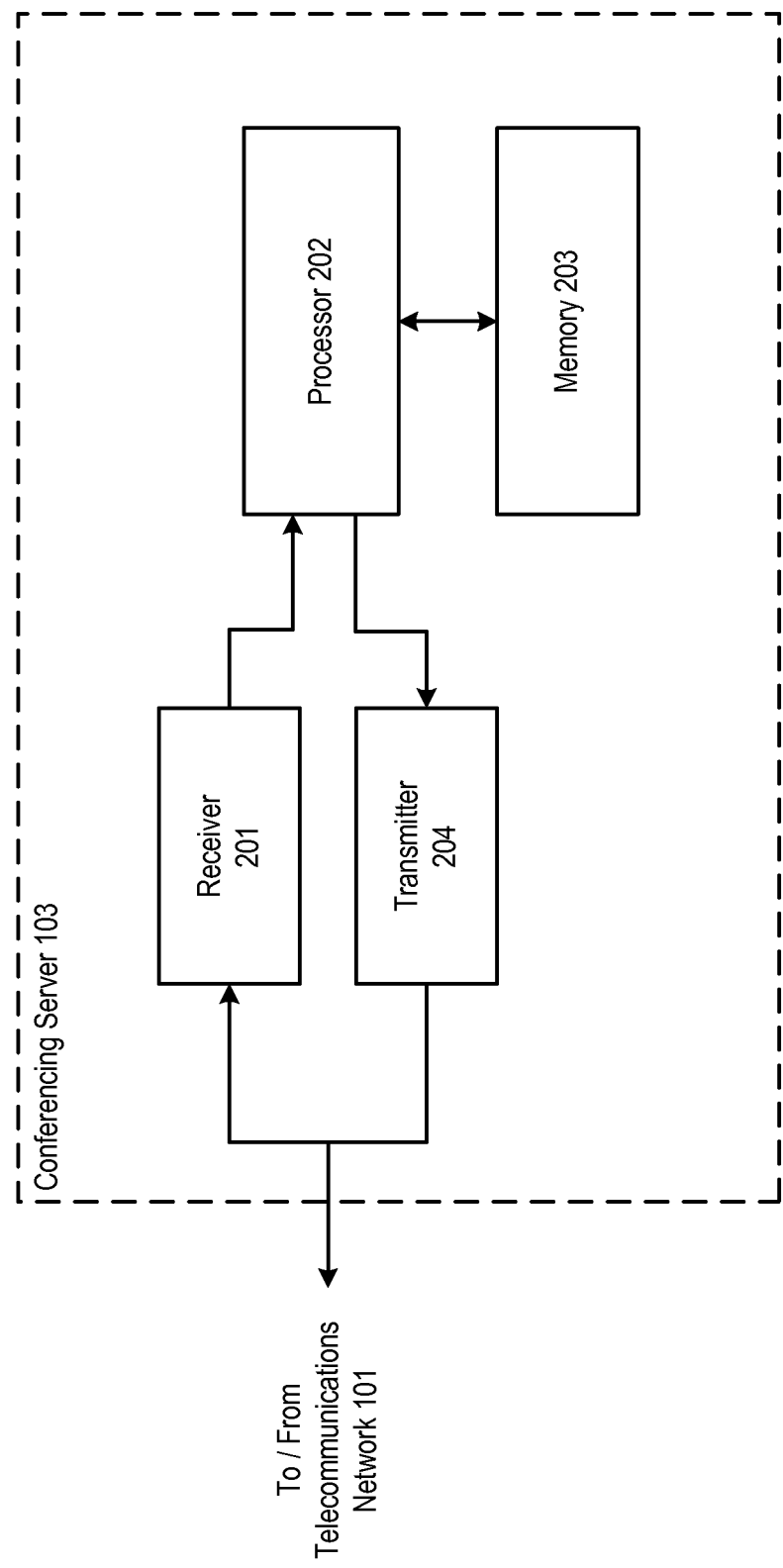
FIG. 2 depicts the salient components of conferencing server 103 in accordance with the illustrative embodiment of the present invention.

FIG. 2 depicts the salient components of conferencing server 103 in accordance with the illustrative embodiment of the present invention. Server 103 comprises receiver 201, processor 202, memory 203, and transmitter 204, interconnected as shown.

Receiver 201 receives signals from other nodes (e.g., telecommunications terminal 102-$m$, administrator terminal 104, etc.) via network 101 and forwards the information encoded in the signals to processor 202, in well-known fashion. It will be clear to those skilled in the art, after reading this specification, how to make and use receiver 201.

Processor 202 is a general-purpose processor that is capable of receiving information from receiver 201, executing instructions stored in memory 203, reading data from and writing data into memory 203, executing the tasks described below and with respect to FIGS. 3 through 5, mixing two or more media signals together, and transmitting information to transmitter 204. In some alternative embodiments of the present invention, processor 202 might be a special-purpose processor. In either case, it will be clear to those skilled in the art, after reading this specification, how to make and use processor 202.

Memory 203 stores the instructions and data used by processor 202. Memory 203 might be any combination of dynamic random-access memory (RAM), flash memory, disk drive memory, and so forth. It will be clear to those skilled in the art, after reading this specification, how to make and use memory 203.

Transmitter 204 receives information from processor 202 and transmits signals that encode this information to other nodes (e.g., telecommunications terminal 102-m, administrator terminal 104, etc.) via network 101, in well-known fashion. It will be clear to those skilled in the art, after reading this specification, how to make and use transmitter 204.

Figure 3:
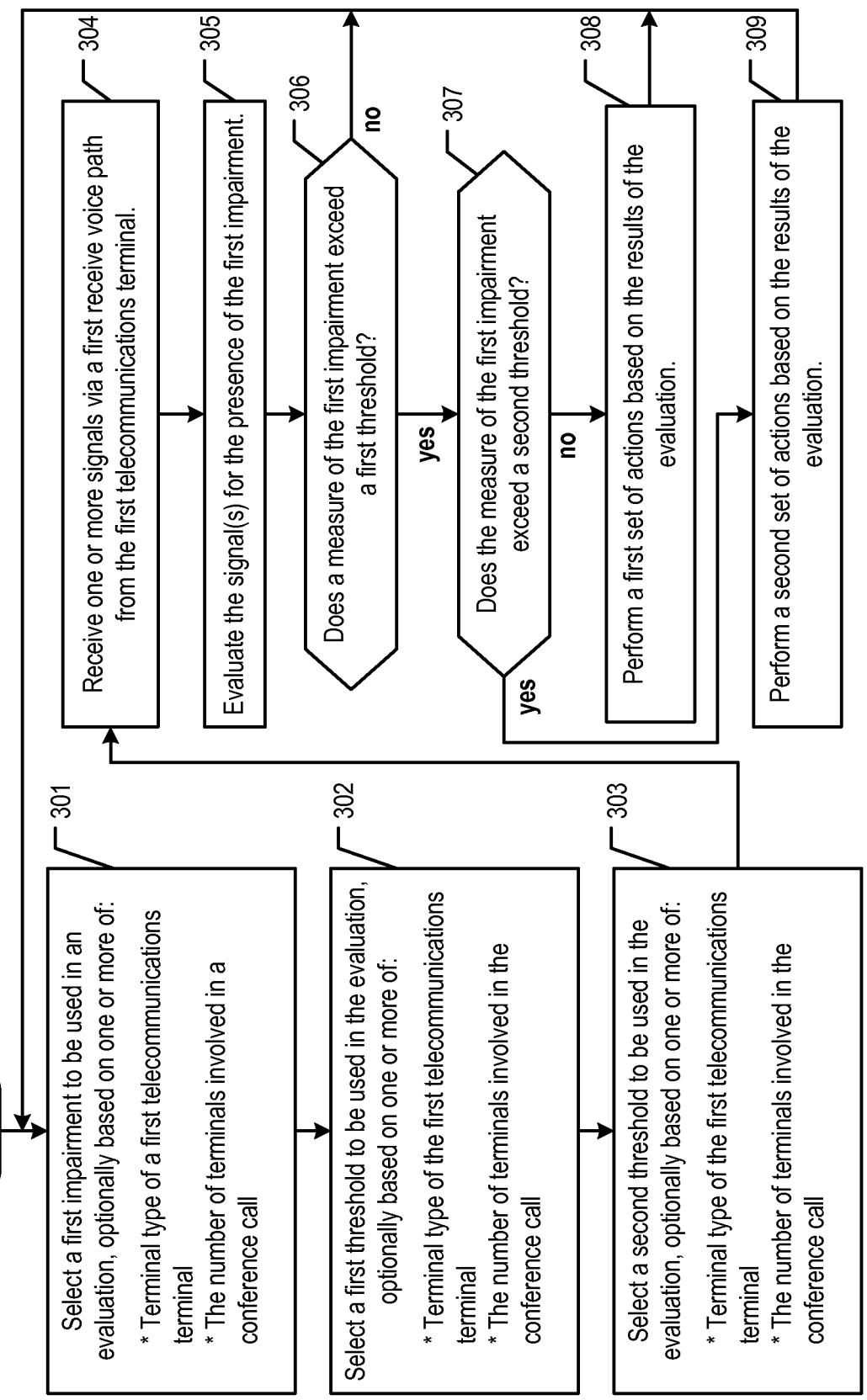
FIG. 3 depicts a flowchart diagram of the salient tasks performed by conferencing server 103 in monitoring and controlling the media signals in a conference call, in accordance with the illustrative embodiment of the present invention.

FIG. 3 depicts a flowchart diagram of the salient tasks performed by conferencing server 103 in monitoring and controlling the media signals in a conference call, in accordance with the illustrative embodiment of the present invention. As those who are skilled in the art will appreciate, some of the events that appear in FIG. 3 can occur in parallel or in a different order than that depicted.

In accordance with the illustrative embodiment, server 103 can monitor and control signals that are being received from all of the telecommunications terminals on a conference call or from a subset of the terminals on the call. For pedagogical purposes, terminals 102-1 through 102-M are all on the same voice conference call, which is being administered via administrator terminal 104. Furthermore, server 103 is presently monitoring and reacting to the voice signals that are being received on the receive voice paths from one or more terminals, in particular from terminal 102-1. As those who are skilled in the art will appreciate, the present invention can be applied to embodiments in which a media signal other than or in addition to voice is featured and evaluated for the presence of impairments, either on the voice path or on a separate signal path.

At task 301, server 103 selects a first impairment to be used in a signal evaluation. The selected impairment can be one of the following:
i. signal level mismatch, relative to signal levels experienced on other voice paths;
ii. distortion;
iii. noise;
iv. fading;
v. crosstalk; and
vi. echo.

As those who are skilled in the art will appreciate, other types of impairments can be considered in the selection process. In some embodiments, the selection of a particular type of impairment is based on one or more of:
i. a pre-determined value (e.g., a hardcoded value, an operator-specified value, etc.);
ii. the terminal type or some other characteristic of the telecommunications terminal that is originating the media signals to be evaluated (e.g., terminal 102-1, etc.);
iii. a characteristic of the signal path, or some part of, through which the media signals are received; and
iv. the number of telecommunications terminals that are involved in the conference call.

Note that the selected impairment can be applied to the entire system, to a portion of the system, on a per-signal path basis, on a per-terminal basis, and so forth. Furthermore, the selected impairment can be based on other properties that are not listed above.

At task 302, server 103 selects a first threshold to be used as part of the signal evaluation, in relation to the selected first impairment. The selected first threshold, in some embodiments, is based on one or more of:
i. a pre-determined value (e.g., a hardcoded value, an operator-specified value, etc.);
ii. the terminal type or some other characteristic of the telecommunications terminal that is originating the media signals to be evaluated (e.g., terminal 102-1, etc.);
iii. a characteristic of the signal path, or some part of, through which the media signals are received; and
iv. the number of telecommunications terminals that are involved in the conference call.

Note that the selected first threshold can be applied to the entire system, to a portion of the system, on a per-signal path basis, on a per-terminal basis, and so forth. Furthermore, the selected first threshold can be based on other properties that are not listed above.

At task 303, server 103 selects a second threshold to be used as part of the signal evaluation, in relation to the selected first impairment. The selected second threshold, in some embodiments, is based on one or more of:
i. a pre-determined value (e.g., a hardcoded value, an operator-specified value, etc.);
ii. the terminal type or some other characteristic of the telecommunications terminal that is originating the media signals to be evaluated (e.g., terminal 102-1, etc.);
iii. a characteristic of the signal path, or some part of, through which the media signals are received; and
iv. the number of telecommunications terminals that are involved in the conference call.

Note that the selected second threshold can be applied to the entire system, to a portion of the system, on a per-signal path basis, on a per-terminal basis, and so forth. Furthermore, the selected second threshold can be based on other properties that are not listed above.

At task 304, server 103 receives one or more voice signals, from terminal 102-1, via a first receive voice path (i.e., the signal path between terminal 102-1 and server 103).

At task 305, server 103 evaluates the signals for the presence of the first impairment, which was selected at task 301. In evaluating the signals, server 103 determines whether a measure of the first impairment exceeds the first threshold, which was selected at task 302. As those who are skilled in the art will appreciate, additional impairments can be considered and evaluated against their corresponding thresholds.

At task 306, server 103 checks if the measure of the first impairment exceeds the first threshold. If the measure exceeds the first threshold, then task execution proceeds to task 307. If not, then task execution proceeds to task 301.

At task 307, server 103 checks if the measure of the first impairment exceeds the second threshold. In accordance with the illustrative embodiment, the second threshold is greater than the first threshold. In some alternative embodiments, the second threshold might be less than the first threshold. If the measure exceeds the second threshold, then task execution proceeds to task 309. If not, then task execution proceeds to task 308.

At task 308, server 103 performs a first set of actions, which are described below and with respect to FIG. 4. Task execution then proceeds to task 301

At task 309, server 103 performs a second set of actions, which are described below and with respect to FIG. 5. Task execution then proceeds to task 301.

Figure 4:
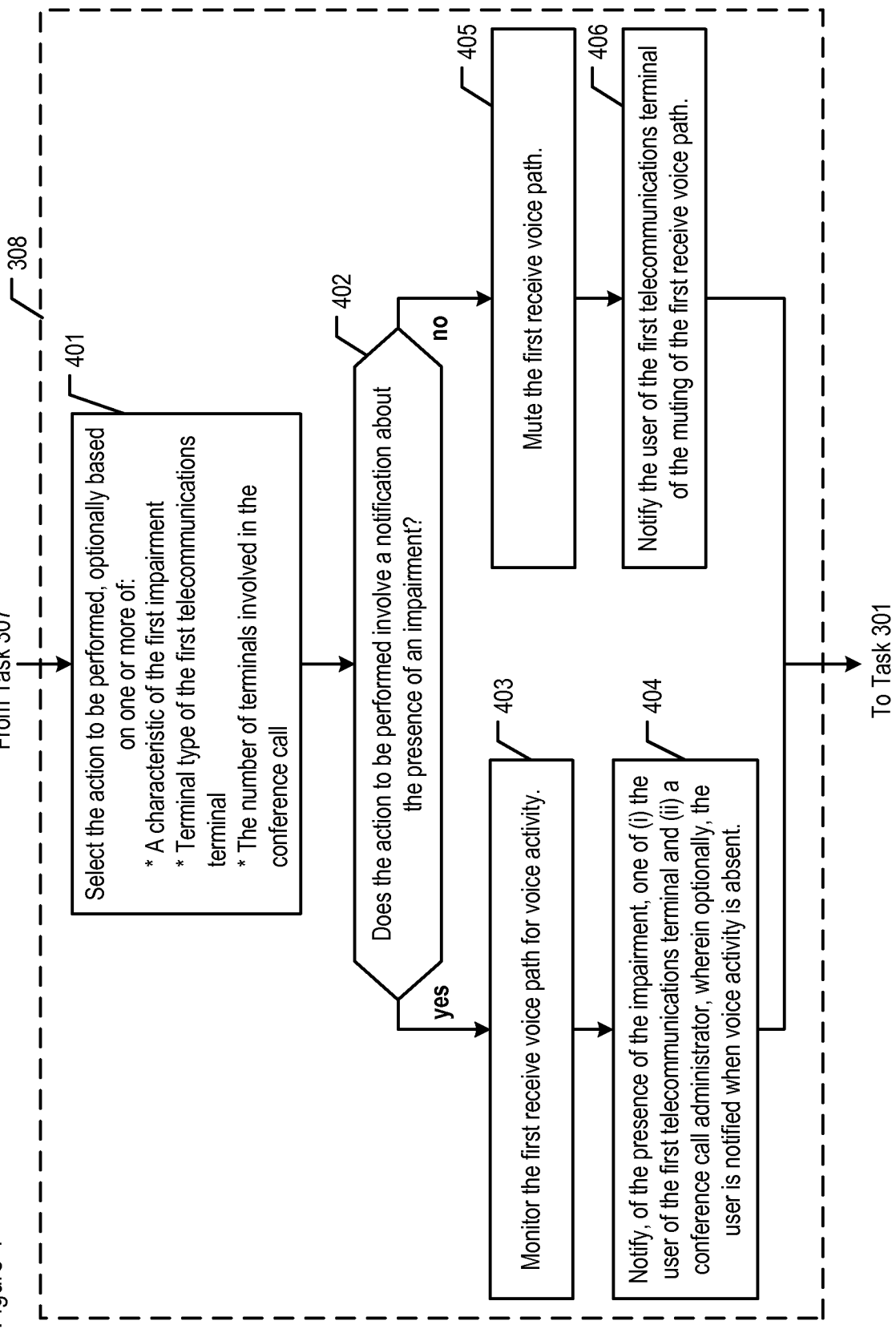
FIG. 4 depicts a flowchart of the salient subtasks performed by conferencing server 103 as part of task 308 in FIG. 3.

FIG. 4 depicts a flowchart of the salient subtasks performed by conferencing server 103 as part of task 308, in accordance with the illustrative embodiment of the present invention. As those who are skilled in the art will appreciate, some of the events that appear in FIG. 4 can occur in parallel or in a different order than that depicted.

At task 401, server 103 selects which subset of actions (i.e., tasks 403 and 404 or tasks 405 and 406) is to be performed as the result of the first threshold having been exceeded. In accordance with the illustrative embodiment, the selection depends on one or more of:
 i. a pre-determined value (e.g., a hardcoded value, an operator-specified value, etc.);
 ii. a characteristic of the first impairment (e.g., type, magnitude, trend, source, etc.);
 iii. the terminal type or some other characteristic of the telecommunications terminal that is originating the media signals to be evaluated (e.g., terminal 102-1, etc.);
 iv. a characteristic of the signal path, or some part of, through which the media signals are received; and
 v. the number of telecommunications terminals that are involved in the conference call.
In some alternative embodiments, only tasks 403 and 404 are executed.

At task 402, server 103 checks whether the actions to be performed involve a notification about the presence of an impairment. If they do, task execution proceeds to task 403. If not, task execution proceeds to task 405.

At task 403, server 103 monitors the first receive voice path (i.e., the path from terminal 102-1) for voice activity in well-known fashion. In some alternative embodiments, server 103 skips this task.

At task 404, server 103 notifies an individual of the presence of the impairment. The notified individual can be the user of the first telecommunications terminal (i.e., terminal 102-1) or the conference call administrator through terminal 104. Server 103 can notify the individual in one of several ways, including using the transmit path to communicate with the individual, instant messaging the individual, and so forth. In some embodiments, the user is notified only when there is no voice activity detected in the receive voice path (i.e., when terminal 102-1's user has stopped talking). Task execution then proceeds to task 301.

At task 405, server 103 mutes the first voice receive path in well-known fashion.

At task 406, server 103 notifies the user of the first telecommunications terminal of the muting of the first receive voice path. Server 103 can notify the user in one of several ways, including breaking into the transmit path to communicate with the user, instant messaging the user, and so forth. Task execution then proceeds to task 301.

Figure 5:
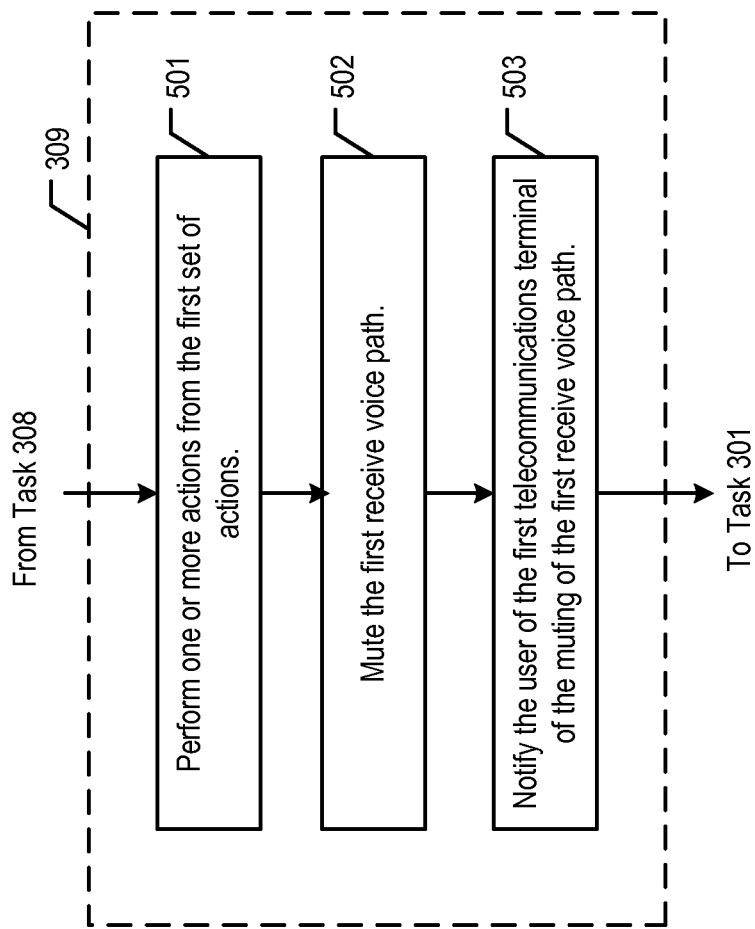
FIG. 5 depicts a flowchart of the salient subtasks performed by conferencing server 103 as part of task 309 in FIG. 3.

FIG. 5 depicts a flowchart of the salient subtasks performed by conferencing server 103 as part of task 309, in accordance with the illustrative embodiment of the present invention. As those who are skilled in the art will appreciate, some of the events that appear in FIG. 5 can occur in parallel or in a different order than that depicted.

At task 501, in some embodiments, server 103 performs one or more actions from the first set of actions, which is depicted in FIG. 4.

At task 502, server 103 mutes the first receive voice path in well-known fashion.

At task 503, server 103 notifies the user of the first telecommunications terminal of the muting of the first receive voice path. Server 103 can notify the user in one of several ways, including breaking into the transmit path to communicate with the user, instant messaging the user, and so forth. Task execution then proceeds to task 301.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method of determining signal path quality in a conference call comprising:
 selecting, by a data-processing system, a first impairment to detect among a plurality of impairments, wherein the first impairment is selected based on a first criteria, wherein said first criteria is the number of telecommunications terminals that are participating in the conference call;
 receiving, by the data-processing system from a telecommunications terminal during the conference call, a signal via a voice path;
 selecting, by the data-processing system, a threshold $T_1$ based on a second criteria that is different from the first criteria, wherein said second criteria is the terminal type of the telecommunications terminal;
 evaluating, by the data-processing system, the signal for the presence of the first impairment; and
 selecting, by the data-processing system, one of the following tasks when the first impairment is present in the signal and a measurement of the first impairment exceeds the threshold $T_1$:
 transmitting, by the data-processing system, a first notification to an administrator of the conference call, and
 muting, by the data-processing system, the voice path and transmitting a second notification to the telecommunications terminal.

2. The method of claim 1 wherein selecting the threshold $T_1$ comprises:
 selecting, by the data-processing system, a threshold $T_2$ based on a third criteria, wherein $T_1 < T_2$, wherein the third criteria is a characteristic of the voice path;
 muting, by the data-processing system, the voice path when the measurement of the first impairment exceeds the threshold $T_1$ and the threshold $T_2$.

3. The method of claim 2 wherein muting the voice path when the measurement of the first impairment exceeds the threshold $T_1$ and the threshold $T_2$ further comprises:
 transmitting, by the data-processing system, the second notification to the telecommunications terminal, wherein the second notification notifies a user of the telecommunications terminal that the voice path is muted.

4. The method of claim 1 wherein selecting one of the tasks by the data-processing system is also based on at least one of:
a magnitude of the first impairment,
a trend of the first impairment, and
a source of the first impairment.

5. A method of determining signal path quality in a conference call comprising:
selecting, by a data-processing system, a first impairment to detect among a plurality of impairments, wherein said selecting is based on a first criteria;
selecting by the data-processing system:
a threshold $T_1$ based on a second criteria, and
a threshold $T_2$ based on a third criteria,
wherein the threshold $T_1$ is less than the threshold $T_2$;
receiving, by the data-processing system via a voice path, a signal from a telecommunications terminal during the conference call;
evaluating, by the data-processing system, whether the first impairment is present in the signal; and
selecting, by the data-processing system, at least one of a first task and a second task based on whether a measurement of the first impairment is:
greater than $T_1$ but less than $T_2$, and
greater than $T_2$,
wherein:
said first criteria is one of a terminal type of the telecommunication terminal, a number of telecommunications terminals that are participating in the conference call and a characteristic of the voice path;
said second criteria is one of a terminal type of the telecommunication terminal, a number of telecommunications terminals that are participating in the conference call and a characteristic of the voice path, and said second criteria is different that said first criteria; and
said third criteria is one of a terminal type of the telecommunication terminal, a number of telecommunications terminals that are participating in the conference call and a characteristic of the voice path, and said third criteria is different than said first criteria and said second criteria.

6. The method of claim 5 further comprising:
selecting, by the data-processing system, the first task when the measurement of the first impairment is greater than $T_1$ but less than $T_2$; and
selecting, by the data-processing system, at least one of a first subtask and a second subtask in the first task based on a third criteria that is different from the first criteria and the second criteria.

7. The method of claim 6 wherein the third criteria is a characteristic of the first impairment, and wherein the characteristic of the first impairment is at least one of:
a magnitude of the first impairment,
a trend of the first impairment, and
a source of the first impairment.

8. The method of claim 6 wherein the first subtask comprises:
monitoring, by the data-processing system, the voice path for voice activity, and
transmitting, by the data-processing system, a first notification to an administrator of the conference call;
wherein the second subtask comprises:
muting, by the data-processing system, the voice path, and
transmitting, by the data-processing system, a second notification to the telecommunications terminal, wherein the second notification is different from the first notification.

9. The method of claim 8 wherein:
the first notification notifies the administrator of the conference call that the signal received from the telecommunications terminal comprises the first impairment, and
the second notification notifies the user of the telecommunications terminal that the voice path is mute.

10. The method of claim 5 wherein the second task is selected by the data-processing system when the measurement of the first impairment is greater than $T_2$; and
wherein the second task comprises:
muting, by the data-processing system, the voice path, and
transmitting, by the data processing system, a notification that notifies a user of the telecommunications terminal that the voice path is mute.

11. The method of claim 5 wherein the first impairment is a signal level mismatch of the voice path relative to other signal levels on other voice paths in the conference call.

12. The method of claim 5 wherein the first impairment is echo in the voice path.

* * * * *